(12) United States Patent
Maehara

(10) Patent No.: US 7,183,749 B2
(45) Date of Patent: Feb. 27, 2007

(54) VEHICLE GENERATOR CONTROL SYSTEM

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 418 days.

(21) Appl. No.: 10/736,608

(22) Filed: Dec. 17, 2003

(65) Prior Publication Data

US 2004/0135374 A1 Jul. 15, 2004

(30) Foreign Application Priority Data

Dec. 24, 2002 (JP) ............................. 2002-371179

(51) Int. Cl.
*H02H 7/06* (2006.01)
*H02P 9/00* (2006.01)
*H02P 9/02* (2006.01)

(52) U.S. Cl. ............................. 322/22; 322/25; 322/29

(58) Field of Classification Search .................. 322/22
See application file for complete search history.

(56) References Cited

U.S. PATENT DOCUMENTS 4,739,243 A * 4/1988 Iwatani et al. ................ 322/10
5,140,253 A    8/1992 Itoh ............................. 322/28
5,266,882 A    11/1993 Morishita ...................... 322/28
5,448,154 A    9/1995 Kanke et al. .................. 322/28
5,925,939 A    7/1999 Iwatani et al. ............. 307/10.1
RE36,454 E  * 12/1999 Ball et al. ...................... 322/23
6,043,632 A  *  3/2000 Maehara et al. ............... 322/28

FOREIGN PATENT DOCUMENTS

| JP | A 2-307400 | 12/1990 |
| JP | A 5-316667 | 11/1993 |
| JP | A 6-197473 | 7/1994 |
| JP | B2 2776980 | 5/1998 |

* cited by examiner

*Primary Examiner*—Brian Sircus
*Assistant Examiner*—Hal I. Kaplan
(74) *Attorney, Agent, or Firm*—Oliff & Berridge, PLC

(57) ABSTRACT

A generator control system of a vehicle generator includes a switching element which turns on or off field current, a field current detecting circuit, a calculating circuit which calculates an average value of the field current when the switching element turns on according to an amount of the detected field current, and a switch control circuit which cyclically controls the switching element according to the average value and a limit value of the field current.

6 Claims, 6 Drawing Sheets

VEHICLE GENERATOR CONTROL SYSTEM

CROSS REFERENCE TO RELATED APPLICATION

The present application is based on and claims priority from Japanese Patent Application 2002-371179, filed Dec. 24, 2002, the contents of which are incorporated herein by reference.

BACKGROUND OF THE INVENTION

1. Field of the Invention

The present invention relates to a vehicle generator control system which controls field current to be supplied to a field coil of a generator so as to regulate the output voltage of the generator.

2. Description of the Related Art

Recently, there is a demand for increasing output power of a vehicle generator although torque for driving electric accessories has been reduced to improve gas mileage. Accordingly, engine idling rotation may change widely if the output power of the vehicle generator changes. In order to prevent the above problem, the engine is controlled according to data on the input torque of the generator, such as the field current. Such data are transmitted from the generator to an engine control system, which controls the engine and the generator according to a vehicle operating condition.

U.S. Pat. No. 5,140,253 or its counterpart JP-A-2-184300, U.S. Pat. No. 5,448,154A or its counterpart JP-B-2916837 and JP-A-2-307400 disclose vehicle generator control systems which include a field current drive transistor for controlling the field current of the vehicle generator to be lower than a predetermined current value. In such generator control systems, the field current flowing through the drive transistor is detected, so that the drive transistor is turned off if an amount of the field current exceeds a limit current value. Therefore, sharp increase in the input torque of the generator can be prevented even if electric load of the generator abruptly increases. Thus, smooth operation of the engine can be ensured.

In the vehicle generator control system disclosed in JP-A-2-184300, the field current driving transistor is turned off for a fixed period if the field current exceeds a limit current value even in an instant. This does not properly control the field current. The field current driving transistor of this control system is not controlled at a fixed cycle. Therefore, temperature rise caused by switching loss of the drive transistor increases if the switching cycle is very short. On the other hand, the output voltage of the vehicle generator changes widely if the switching cycle is very long.

Further, it is not possible to detect the amount of the current flowing through a flywheel diode when the drive transistor is turned off. If the field current driving transistor is turned off for a long time, the amount of the field current becomes zero. However, the driving transistor is controlled as if the amount of the field current is the same as the field current right before the transistor is turned off. As a result, a big difference in the input torque of the vehicle generator from the fact may arise, resulting in undesired increase in engine rotation.

For example, in a conventional vehicle generator control system, the field current driving transistor is turned on or off to regulate the output voltage of a vehicle generator to a regulation voltage when an electric load is connected. If the electric load is disconnected from the generator thereafter, the output voltage of the generator increases to be higher than the regulation voltage Vreg until the field current is reduced. In the meanwhile, the field current driving transistor is turned off. Because the field current can be detected only while the field current driving transistor is turning on, the conventional generator control system carries out its control according to the field current before the electric load is disconnected from the generator. Because the field current flowing through the field coil decreases according to the time constant of the field coil, there is a difference ΔIF in the detected current value from the actual current value, as shown in FIG. 9. This difference causes a temporary increase in engine rotation when the engine is idling.

In the vehicle generator control system disclosed in JP-B-2916837 or JP-A-2-307400, the field current flowing through the field driving transistor is smoothed in order to detect an amount of the field current. It is not possible to take the current flowing through the flywheel diode into account.

SUMMARY OF THE INVENTION

The present invention is made in view of the above problems and has an object of providing a vehicle generator control system that can accurately detect field current.

Another object of the invention is to provide a vehicle generator control system that can prevent problems caused by change in the switching cycle of the field current driving transistor.

According to a feature of the invention, a generator control system of a vehicle generator includes a switching element which turns on or off to control field current, field current detecting means for detecting current flowing through the switching element, calculating means for calculating an average value of the field current when the switching element turns on according to an amount of the current detected by the field current detecting means and switch controlling means for cyclically controlling the switching element according to the average value of the field current and a limit value of the field current.

Because the average value of the field current is calculated from the current flowing through the switching element, it is possible to carry out an accurate detection of the field current, whereby an accurate field current control can be provided.

Preferably, the calculating means calculates the average value according to an amount of current detected by the field current detecting means right after the switching element switches its operation from turning off to turning on and an amount of current detected by the field current detecting means right before the switching element switches its operation from turning on to turning off. Therefore, accurate average value of the field current can be calculated.

The switch controlling means may determine a duty ratio of the subsequent operation of the switch element according to the average value of the field current, the limit value of the field current and a duty ratio of the last operation of the switch element.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle generator control system according to a preferred embodiment of the invention will be described with reference to the appended drawings.

Figure 1:
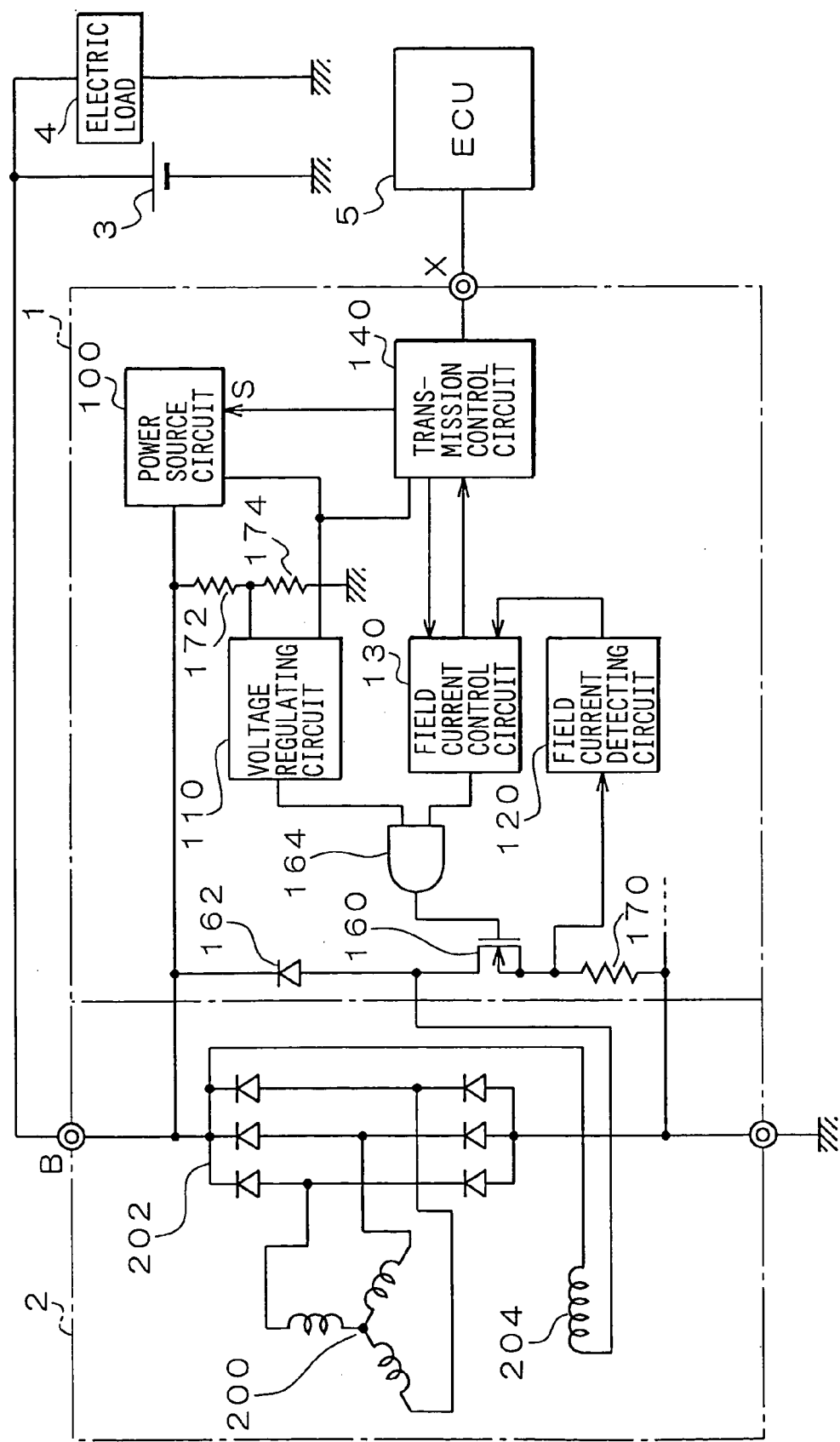
FIG. 1 is a circuit diagram of a vehicle generator control system according to a preferred embodiment of the invention.

As shown in FIG. 1, a vehicle generator control system 1 is connected to a generator 2 for a vehicle so that the voltage of an output terminal B of the generator can be regulated to a predetermined regulation voltage (e.g. 14 V).

A vehicle generator 2 includes a three-phase stator winding 200 mounted in a stator core, a rectifier unit 202 which fully rectifies three-phase output power generated by the stator winding 200 and a field coil 204 mounted in a rotor. The output voltage of the vehicle generator 2 is regulated by the vehicle generator control system 1 which controls current supplied to the field coil 204. The vehicle generator 2 has a B terminal connected to a battery 3 and an electric load 4 so that electric power can be supplied from the B terminal to the battery 3 and the electric load 4. The vehicle generator control system 1 is connected to an engine control unit (ECU) 5 via a signal transmission terminal X.

As shown in FIG. 1, the vehicle generator control system 1 includes a power source circuit 100, a voltage regulating circuit 110, a field current detecting circuit 120, a field current control circuit 130, a signal transmission control circuit 140, a field current driving transistor 160, a flywheel diode 162, an AND circuit 164 and resistors 170, 172, 174.

The power source circuit 100 has an S terminal which provides a driving voltage to be applied to various circuits of the vehicle generator control system 1. The voltage regulating circuit 110 detects the output voltage of the vehicle generator 2 via a voltage dividing circuit formed of the resistors 172, 174 and provides a pulse width modulation (PWM) signal of a predetermined cycle so as to regulate the output voltage to a regulation voltage Vreg.

Figure 2:
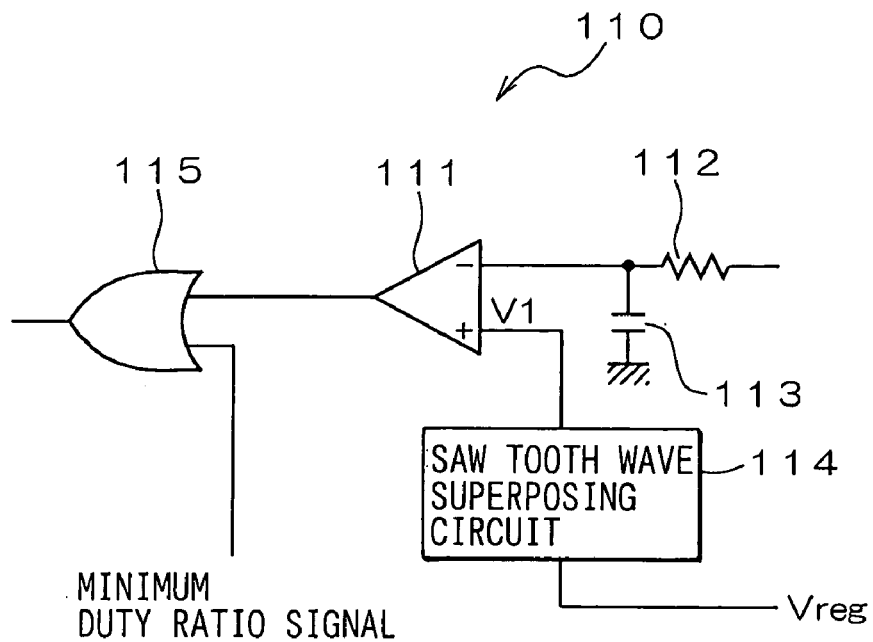
FIG. 2 is a circuit diagram of a voltage regulating circuit of the vehicle generator control system.

As shown in FIG. 2, the voltage regulating circuit 110 includes a voltage comparator 111, a resistor 112, a capacitor 113, a saw tooth wave superposing circuit 114 and an OR circuit 115. The resistor 112 and the capacitor 113 form a low-pass filter, which smooths a portion of the output voltage of the vehicle generator divided by the resistors 172, 174. The smoothed voltage is inputted to a negative terminal of the voltage comparator 111. The saw tooth wave superposing circuit 114 superposes a saw tooth signal of a prescribed cycle (e.g. 5 ms) on the regulation voltage Vreg (correctly, a portion of the regulation voltage Vreg divided by the resistors 172, 174) provided by the signal transmission control circuit 140 and provides reference voltage V1, which is inputted to a positive terminal of the voltage comparator 111. The voltage comparator 111 compares the smoothed voltage that corresponds to the generator's output voltage with the reference voltage V1 that is inputted from the saw tooth wave superposing circuit 114. If the smoothed voltage is lower than the reference voltage V1, the voltage comparator 111 provides a high level signal. On the other hand, it provides a low level signal if the smoothed voltage is higher than the reference voltage V1. The OR circuit 115 provides an output signal that corresponds to a logical sum of the output signal of the voltage comparator 111 and a minimum duty ratio signal. The minimum duty ratio signal has the same cycle as the saw tooth wave signal superposed by the saw tooth wave superposing circuit 114 and also has a minimum duty ratio of about 3%.

Figure 3:
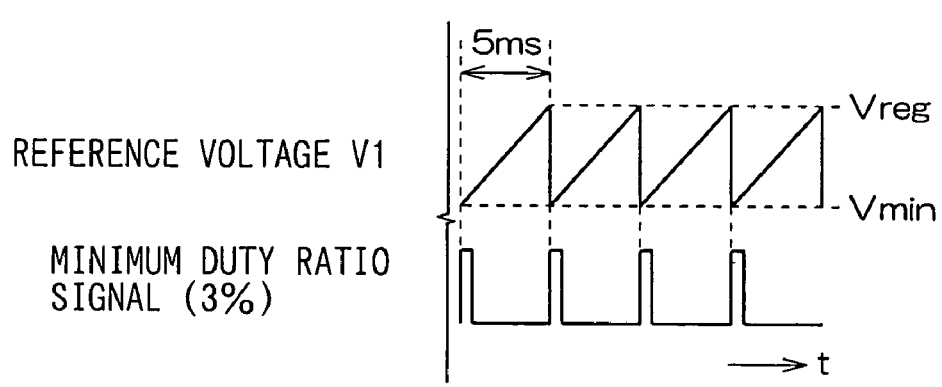
FIG. 3 is a graph showing signal waves at portions of the voltage regulating circuit.

As shown in FIG. 3, the reference voltage V1 has a wave shape formed by the saw tooth wave superposing circuit 114, and the minimum duty ratio signal has 3%-duty ratio, which is inputted to the OR circuit 115. Thus, the reference voltage having the peak voltage of Vreg and the minimum voltage of Vmin each cycle can be provided by superposing the saw tooth wave on the regulation voltage Vreg.

Figure 4:
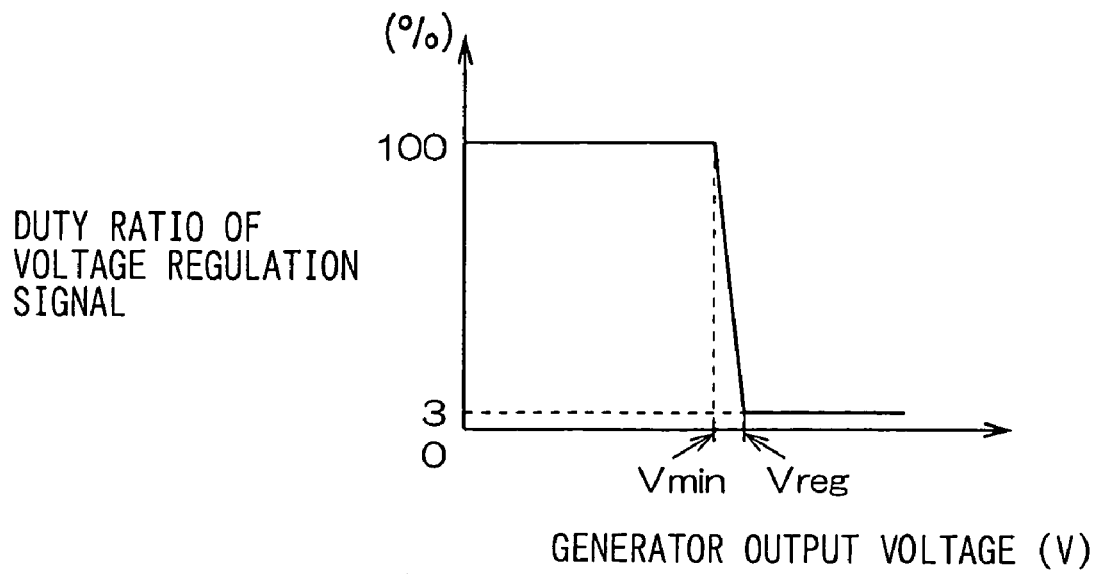
FIG. 4 is a graph showing a relationship between the duty ratio of voltage regulation signal and the output voltage of a vehicle generator.

As shown in FIG. 4, if the output voltage of the vehicle generator 2 is lower than the minimum voltage Vmin, the voltage comparator 111 of the voltage regulating circuit 110 always provides a high level signal. Therefore, the duty ratio of the voltage regulation signal that is outputted from the OR circuit 115 becomes 100%. If the output voltage of the vehicle generator 2 falls between Vmin and the regulation voltage Vreg, the voltage comparator 111 provides a signal having a duty ratio that is determined by the magnitude relation between the two. Such a signal is outputted from the OR circuit 115 as the voltage regulation signal. If the output voltage of the vehicle generator 2 becomes higher than the regulation voltage Vreg, the voltage comparator 11 always provides a low level signal, so that the OR circuit 115 provides the minimum duty ratio signal whose duty ratio is 3%.

The field current detecting circuit 120 detects the field current flowing through the field coil 204 based on the potential of the source of the field current driving transistor 160, which is an N-channel MOSFET. The resistor 170 is connected to the source of the field current driving transistor 160 as a field current detecting resistor. The amount of field current is detected by the field current detecting circuit 120 based on the voltage difference between opposite ends of the resistor 170 when the field current flows through the source-drain of the field current driving transistor 160 and the resistor 170.

Figure 5:
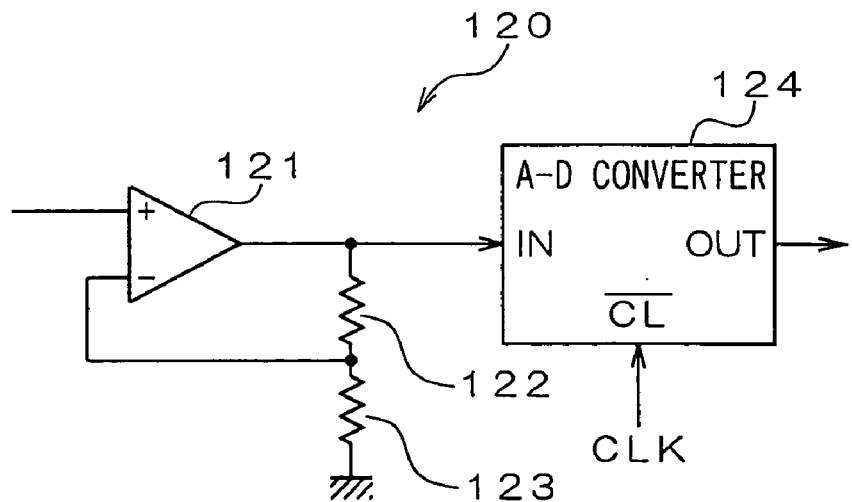
FIG. 5 is a circuit diagram of a field current detecting circuit of the generator control system.

As shown in FIG. 5, the field current detecting circuit 120 includes an operational amplifier 121, resistors 122, 123 and an A-D converter 124. A prescribed amplifying ratio of the operational amplifier 121 is determined by the resistors 122, 123, so that an input signal whose voltage is proportional to the amount of the field current is amplified. The A-D converter 124 has an input terminal (IN) to which the amplified signal is inputted and a clock terminal (CL) to which a clock signal CLK of a predetermined frequency is inputted. When the clock signal CLK changes from a high level to a low level, the A-D converter 124 takes in the output voltage of the amplifier 121 to convert it to a digital data (relative to the field current) of a predetermined number of bits. The frequency of the clock signal CLK is n (e.g. 64) times as many as the frequency of the minimum duty ratio signal. The frequency of the clock signal CLK corresponds to the limit of resolution (the number of steps) of the PWM signal.

The field current control circuit 130 calculates the average value of the field current based on the amount of the field current flowing through the field current driving transistor 160. The transmission control circuit 140 controls the field current so that the amount can be less than a field current limit value IFref.

The transmission control circuit 140 exchanges a serial communication with the ECU 5 via the transmission terminal X. The transmission control circuit 140 receives an operation start signal, a regulation voltage signal corresponding to the regulation voltage Vreg, a field current limit signal corresponding to the field current limit value IFreg from the ECU 5 and sends a calculated field current signal corresponding to the average value of the field current calculated by the field current control circuit 130 via the transmission terminal X of the ECU 5.

The ECU 5 sends the operation start signal and the field current limit signal to the vehicle generator control system 1 when a vehicle key switch (not shown) is turned on. The ECU 5 controls the engine according to the calculated current signal.

The operation of the vehicle generator control system 1 will be described below.

[Operation with Normal Load and Battery Being Fully Charged]

When the key switch is turned on, the ECU 5 starts sending the operation start signal to the transmission terminal X of the generator control system 1. When the transmission control circuit 140 receives the operation start signal via the transmission terminal X it inputs a turn on signal to the terminal S of the power source circuit 100. Thereafter, the power source circuit 100 supplies electric power to various circuits of the vehicle generator control system 1, so that the vehicle generator control system 1 fully operates.

Thereafter, although the regulation voltage signal and the field current limit signal are sent from the ECU 5, the output voltage of the vehicle generator 2 is controlled to be the regulation voltage Vreg. However, the amount of the field current is so small that the field current control is not carried out. The field current driving transistor 160 is controlled to turn on or off according to the voltage regulation signal having 5ms-cycle outputted by the voltage regulating circuit 110.

[Operation with Full Load]

When the electric load 4 is very large or the battery 3 is fully discharged, the vehicle generator control system 1 operates to increase the field current so that the output voltage of the vehicle generator 2 becomes as high as the regulation voltage Vreg. However, the average value of the field current is controlled to be less than the field current limit value IFreg by the field current limit signal which is sent from the ECU 5.

Figure 6:
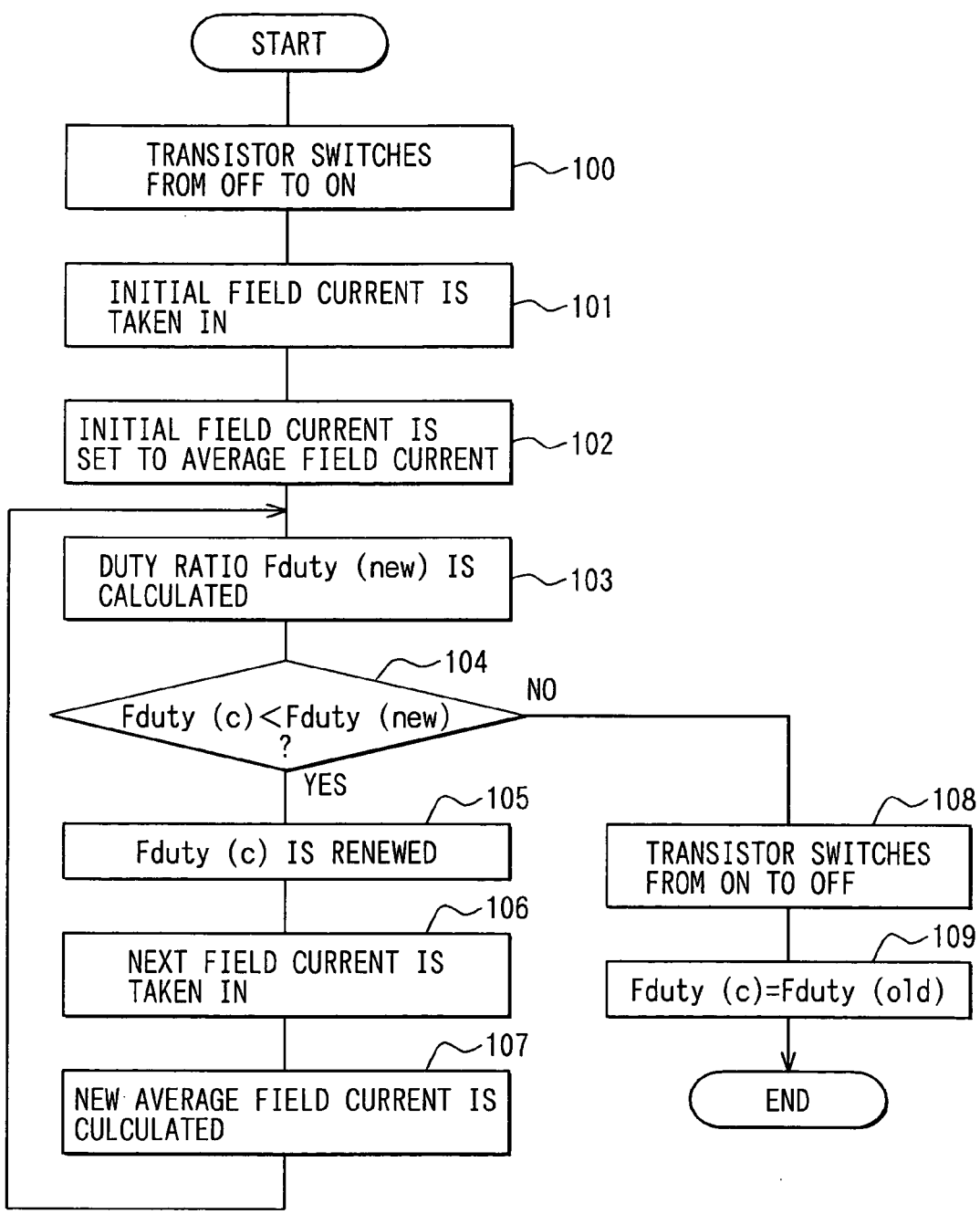
FIG. 6 is a flow diagram of controlling the field current when a large electric load of the vehicle generator is connected.

As indicated by a flow diagram shown in FIG. 6, the voltage regulation signal of the voltage regulating circuit 110 is a PWM signal of 5 milli second cycle. When this signal is inputted to the field current driving transistor 160 via the AND circuit 164, the field current driving transistor 160 turns on and off at 5 milli second intervals at step 100.

After the field current driving transistor 160 switches to a turn-on state from a turn-off state, the field current control circuit 130 takes in a field current value $IF_{ON(1)}$ which the field current detecting circuit 120 first detects at step 101 and sets the same to an average value of the field current IFav at step 102.

Subsequently, the field current control circuit 130 calculates a control duty ratio of this time Fduty(new) with the following formula (1) based on the last control duty ratio Fduty(old) that is set when the field current driving transistor 160 is turned on last time, the field current limit value IFref and the average value of the field current IFav at step 103. Incidentally, the control duty ratio is a duty ratio of a signal for controlling the field current that is inputted to the AND circuit 164 from the field current control circuit 130. The duty ratio is calculated from an average value of the field current that is detected each time and the signal inputted from the transmission control circuit 140.

$$Fduty(new)=Fduty(old)+K(IFref-IFav) \qquad (1)$$

where K is a positive constant.

If the average value of the field current IFav is smaller than the field current limit value IFref, the control duty ratio of this time Fduty(new) is replaced by a value that is larger than the control duty ratio of last time Fduty(old). If, on the other hand, the average value of the field current IFav is larger than the field current limit value IFref, the control duty ratio of this time Fduty(new) is replaced by a value that is smaller than the control duty ratio of last time Fduty(old).

The field current control circuit 130 judges whether a current F duty ratio Fduty(c) is smaller than the control duty ratio of this time Fduty(new) or not at step 104. The current F duty ratio Fduty(c) is initially set to "1". If the resolution limit of the PMW control is 6 bits, the current Fduty ratio Fduty(c) ranges from 1 to 64.

For example, if the control duty ratio of last time Fduty(old) is "32" which corresponds to 50% duty ratio, the step 104 provides YES. Thereafter, the field current control circuit 130 adds "1" to the content of the current F duty ratio Fduty(c) at step 105, takes in the next field current value $IF_{ON(n)}$ at step 106 and calculate an average value of the new field current IFav at step 107 with the following formula (2).

$$IFav=(IF_{ON(1)}+IF_{ON(n)})/2 \qquad (2)$$

Thereafter, the operation returns to step 103 and the subsequent steps in which a new control duty ratio of this time is calculated and other processes are repeated. Thus, the current F duty ratio Fduty(c) gradually increases and the average field current value IFav is calculated each time to renew the current F duty ratio Fduty(c) until the current duty ratio Fduty(c) becomes larger than the control duty ratio Fduty(new) so that the step 104 provides NO.

Next, the field current control circuit 130 changes its high level output signal to a low level output signal to change the field current driving transistor from the turn on state to the turn off state at step 108. The field current control circuit 130 holds the current Fduty ratio Fduty(c) as the last control duty ratio Fduty(old) at step 109. The above steps are carried out in 5 ms cycle each time the field current driving transistor 160 switches from its turn off state to its turn on state.

Figure 7:
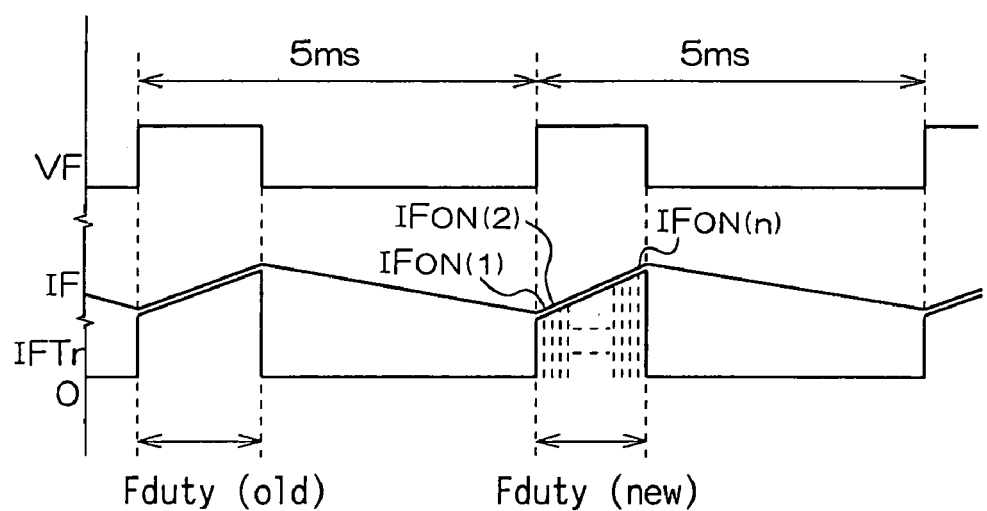
FIG. 7 is a time chart showing operations that correspond to steps shown in FIG. 6.
Figure 8:
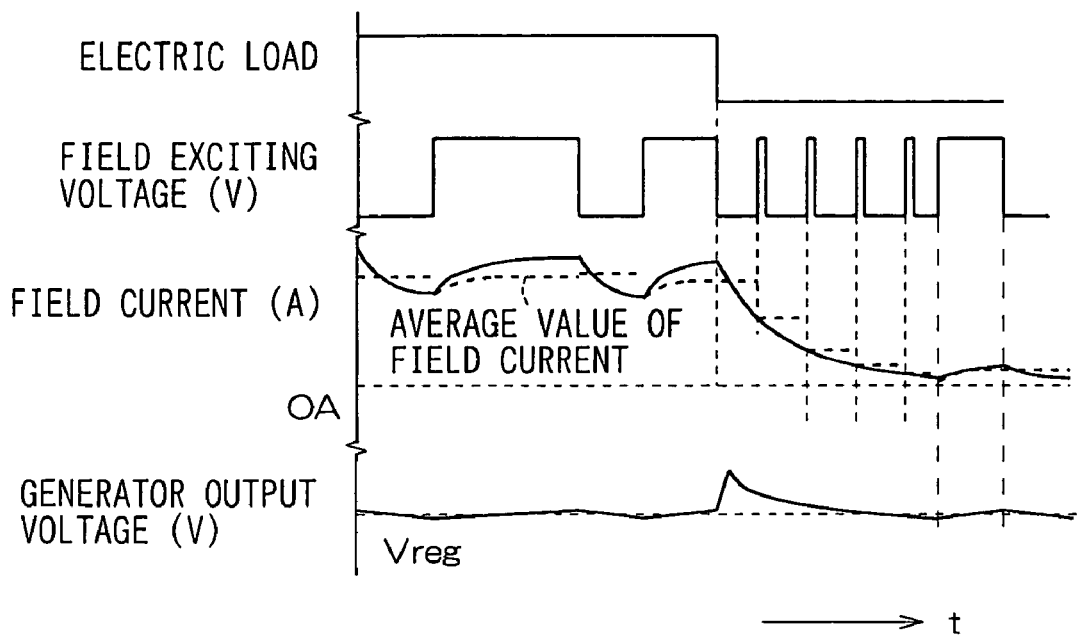
FIG. 8 is a time chart showing the operation of the vehicle generator control system when an electric load is disconnected from the vehicle generator.
Figure 9:
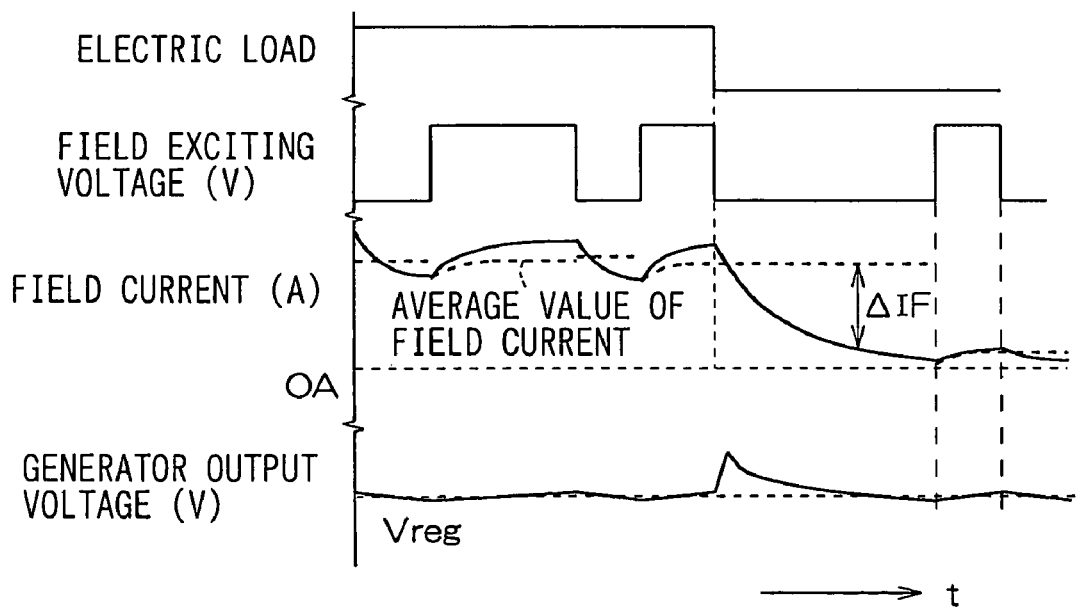
FIG. 9 is a time chart showing operation of a conventional vehicle generator control system when an electric load is disconnected from the vehicle generator.

As shown in FIG. 7, when the field current driving transistor 160 turns on, the field current IF starts increasing. Right after the field current driving transistor 160 turns on, the field current control circuit 130 takes in the initial field current value IFon(1) as the average field current value IFav to calculate the control duty ratio of this time Fduty(new) with the formula (1). At this stage, the current F duty ratio Fduty(c) is "1", which is smaller than the control F duty ratio of this time Fduty(new), and the field current control circuit 130 takes in the second field current value IFon(2). This kind of operation is repeated until the current F duty ratio Fduty(c) becomes larger than the control duty ratio Fduty (new), whereby the field current control circuit 130 switches its output signal from a high level signal to a low level signal.

Thus, a current average value of the field current is calculated to set a control duty ratio of this time Fduty(new) so as to make the average value of the field current converge on the control duty ratio of this time Fduty(new).

[Operation Without Load]

When a large electric load 4 is disconnected from the generator 2, the voltage regulating circuit 110 provides the voltage regulation signal having the minimum duty ratio (e.g. 3%) even if the output voltage of the generator 2 is higher than the regulation voltage Vreg for a long period. Therefore, the field current driving transistor 160 repeatedly turns on at 5 milli-second intervals, so that accurate detection of the field current can be carried out. As a result, an accurate field current value is sent from the transmission control circuit 140 to the ECU 5, which prevents the engine idling rotation speed from abruptly increasing.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator control system of a vehicle generator which includes a field coil, said control system comprising:

a switching element which turns on or off to control field current supplied to the field coil;

field current detecting means for detecting an amount of the field current flowing through said switching element;

calculating means for calculating an average value of the field current supplied to the field coil when said switching element turns on according to the amount of the field current; and switch controlling means for controlling said switching element at fixed intervals according to the average value of the field current and a limit value of the field current, wherein said calculating means calculates the average value according to an amount of the field current detected by said field current detecting means right after said switching element switches its operation from turning off to turning on and an amount of current detected by said field current detecting means right before said switching element switches its operation from turning on to turning off.

2. The control system as claimed in claim 1, wherein said switch controlling means determines a duty ratio of the subsequent operation of the switching element according to the average value of the field current, the limit value of the field current and a duty ratio of the last operation of the switching element.

3. A control system for a vehicle generator which includes a field coil, said control system comprising:

a switching element which controls field current supplied to the field coil;

field current detecting means for detecting an amount of the field current flowing through said switching element;

calculating means for calculating an average value of the field current supplied to the field coil according to an amount of the field current detected by said field current detecting means right after said switching element switches its operation from turning off to turning on and an amount of current detected by said field current detecting means right before said switching element switches its operation from turning on to turning off; and switch controlling means for providing a PWM signal for cyclically controlling said switching element according to the average value of the field current and a limit value of the field current.

4. The control system as claimed in claim 3, wherein said switch controlling means determines a duty ratio of the subsequent PWM signal according to the average value of the field current, the limit value of the field current and a duty ratio of the last operation of the switching element.

5. A generator control system of a vehicle generator which includes a field coil, said control system comprising:

a switching transistor which turns on or off to control field current supplied to the field coil;

field current detecting means for detecting an amount of the field current flowing through said switching transistor;

calculating means for calculating an average value of the field current according to an amount of the field current detected by said field current detecting means right after said switching transistor switches its operation from turning off to turning on and an amount of current detected by said field current detecting means right before said switching transistor switches its operation from turning on to turning off; and switch controlling means for controlling said switching transistor at fixed intervals according to the average value of the field current and a limit value of the field current.

6. The control system as claimed in claim 5, wherein said switch controlling means determines a duty ratio of the subsequent operation of the switching transistor according to the average value of the field current, the limit value of the field current and a duty ratio of the last operation of the switching transistor.

* * * * *